(12) United States Patent
Nelson et al.

(10) Patent No.: US 6,448,353 B1
(45) Date of Patent: Sep. 10, 2002

(54) CONTINUOUS PROCESS FOR THE PRODUCTION OF CONTROLLED ARCHITECTURE MATERIALS

(75) Inventors: James Michael Nelson, Roseville; Jeffrey J. Cernohous, Plymouth, both of MN (US); Michael J. Annen, Hudson, WI (US); James Robert McNerney, Inver Grove Heights, MN (US); Robert Wade Ferguson, St. Paul, MN (US); Barry Eugene Heldman, Cottage Grove, MN (US); James Alan Higgins, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/500,155

(22) Filed: Feb. 8, 2000

(51) Int. Cl.$^7$ ............................................. C08F 126/06
(52) U.S. Cl. ................... 526/265; 526/263; 526/328.5; 526/329.1; 526/329.2
(58) Field of Search ................. 526/263, 265, 526/328.5, 329.1, 329.2

(56) References Cited

U.S. PATENT DOCUMENTS

| | | | |
|---|---|---|---|
| 3,322,857 A | 5/1967 | Coaker et al. | |
| 3,356,763 A | 12/1967 | Dollinger et al. | |
| 3,474,081 A | 10/1969 | Bosworth | |
| 3,565,985 A | 2/1971 | Schrenk et al. | |
| 3,647,612 A | 3/1972 | Schrenk et al. | |
| 4,346,193 A | 8/1982 | Warfel | |
| 4,371,661 A | 2/1983 | Nicholson | |
| 4,442,273 A | 4/1984 | Neiditch et al. | |
| 4,485,210 A | 11/1984 | Neiditch et al. | |
| 4,540,623 A | 9/1985 | Im et al. | |
| 4,572,819 A | 2/1986 | Priddy et al. | |
| 4,985,208 A | 1/1991 | Sugawara et al. | |
| 5,164,454 A | 11/1992 | Suga et al. | |
| 5,166,260 A | 11/1992 | Buonerbs et al. | |
| 5,229,472 A | 7/1993 | Binsbergen et al. | |
| 5,281,651 A | 1/1994 | Arjunan et al. | |
| 5,349,012 A | 9/1994 | Fujita et al. | |
| 5,391,655 A | 2/1995 | Brandstetter et al. | |
| 5,427,842 A | 6/1995 | Bland et al. | |
| 5,587,423 A | 12/1996 | Brandstetter et al. | |
| 5,644,007 A | 7/1997 | Davidson et al. | |
| 5,705,551 A | 1/1998 | Sasaki et al. | |
| 5,713,141 A | 2/1998 | Mitchell et al. | |
| 5,717,040 A | 2/1998 | Brandstetter et al. | |
| 6,160,060 A | 12/2000 | Holliday et al. | |

FOREIGN PATENT DOCUMENTS

| | | |
|---|---|---|
| DE | 42 35 786 | 4/1994 |
| DE | 19648245 A1 | 5/1996 |
| DE | 19701865 A1 | 7/1998 |
| EP | 0 554 142 A1 | 8/1993 |
| EP | 0 749 987 B1 | 3/1999 |
| EP | 0 936 255 | 8/1999 |
| FR | 2 735 480 | 6/1995 |
| JP | 03162475 | 7/1991 |
| WO | WO 92/14732 | 9/1992 |
| WO | WO 93/15141 | 8/1993 |
| WO | WO 94/21727 | 9/1994 |
| WO | WO 94/24208 | 10/1994 |
| WO | WO 96/21557 | 7/1996 |
| WO | WO 97/01585 | 1/1997 |
| WO | WO 97/41162 | 11/1997 |
| WO | WO 98/31721 | 7/1998 |
| WO | WO 99/28128 | 6/1999 |
| WO | WO 99/29777 | 6/1999 |

Primary Examiner—Helen L. Pezzuto
(74) Attorney, Agent, or Firm—Melanie Gover

(57) ABSTRACT

The present invention discloses a continuous process for the production of anionically-polymerized organic materials having controlled architectures. The organic materials may be made from one or more temperature-sensitive anionically-polymerizable monomers. The materials are made under plug-flow and temperature-controlled conditions.

24 Claims, 1 Drawing Sheet

CONTINUOUS PROCESS FOR THE PRODUCTION OF CONTROLLED ARCHITECTURE MATERIALS

FIELD OF THE INVENTION

The present invention relates to a continuous process for the production of anionically-polymerizable polymers in a plug-flow, temperature-controlled reactor.

BACKGROUND INFORMATION

Various types of polymers can be prepared from different monomeric materials, the particular type formed being generally dependent upon the procedures followed in contacting the materials during polymerization. For example, random copolymers can be prepared by the simultaneous reaction of the copolymerizable monomers. Block copolymers are formed by sequentially polymerizing different monomers.

Useful classes of polymers are synthesized via anionic methods. During anionic polymerization, at least one end of the growing polymer is "living," i.e., provides a site for additional monomers to add onto the polymer.

SUMMARY OF THE INVENTION

An ongoing need exists for a controlled process that allows continuously making controlled architecture polymers via anionic polymerization. Controlled architecture refers to a polymer with a designed topology (linear, branched, star, combination network), composition (block copolymer, random copolymer, homopolymer, graft copolymer, tapered or gradient copolymer), and/or functionality (end, site specific, telechelic, multifunctional, macromonomers). The present invention addresses that need.

Briefly, one aspect of the present invention provides a continuous method of producing anionically-polymerized organic material having controlled architecture, including, for example, homopolymers, random copolymers, block copolymers, and starbranched polymers, and end-functionalized polymers.

One embodiment of the present invention provides a continuous process for making an anionically-polymerized organic material having a targeted architecture comprising a) introducing into a reactor having one or more temperature controlled sections at least one anionically-polymerizable monomer, at least one initiator, and a solvent such that the monomer concentration is 10 to 50 weight %;

b) allowing the monomer to polymerize as the reaction mixture travels in an essentially plug flow manner through the reactor; and c) discharging the polymerized organic material.

In other embodiments, the process may further include adding one or more steps between b) and c) above wherein one or more polymerizable monomers are sequentially added to the reaction mixture such that a block copolymer is formed as the reaction mixture continues to travel in an essentially plug flow manner through the stirred tube reactor. Embodiments of the process may also include simultaneously introducing two anionically-polymerizable monomers into the reactor such that a random copolymer is formed. The process may also be used to form star-branched polymers and end-functionalized polymers.

In still other embodiments, the process may further include quenching the polymerized organic material and removing solvent from the polymerized organic material. This invention is particularly useful when at least one anionically-polymerized monomer is temperature sensitive.

The present invention allows the architecture of the produced organic material produced to be controlled by a number of factors including temperature or temperature profile in the reactor, the molar ratio of monomers to initiators, and monomer addition sequence. These factors affect the molecular weight, polydispersity and structure of the final polymerized organic material.

The average molecular weight of the resultant polymeric material is established by controlling the monomer to initiator ratio. This ratio is established by controlling the respective monomer and initiator flow rates. Narrow molecular weight distributions can be obtained by controlling the temperature of the reaction mixture. Avoiding high temperatures minimizes unwanted side reactions that can result in polymer chains having differing molecular weight averages.

Polydispersity can be influenced by the reaction kinetics of the reaction mixture and the minimization of side reactions, especially when temperature sensitive monomers are present. Maintaining optimum temperatures: in each zone of the reactor can positively influence reaction kinetics. Maintaining optimum temperatures can also advantageously affect the solution viscosity and the solubility of the reactants.

The structure of the polymerized organic material is determined by the sequence of monomer addition(s). Homopolymers are formed when only one monomer type is used, random copolymers when more that one monomer type is introduced simultaneously, and segmented block copolymers when more than one monomer type is introduced sequentially.

For the process of the present invention it is preferable that the temperature profile of the reactor be controllable over time and that the reaction mixture be impelled in a relatively plug flow manner through the reactor. This allows the reaction mixture in the reactor at a given location to be subjected to the same reaction conditions as those encountered by previous and subsequent reaction mixture portions as they pass by the same location.

Maintaining temperature control and movement of the reaction mixture in an essentially plug flow manner are complicated by the exothermic nature of the type of reaction being performed, i.e., anionic polymerizations. The use of anionic polymerization methods for the production of block copolymers containing polar monomers (e.g., vinyl pyridine, and alkyl methacrylates) is complicated by side reactions and solution phenomena associated with the aggregation of these materials in solution as micelles. Adequate mixing and temperature control promote the ability to reproduce the same materials, e.g., having a similar average molecular weight and having a narrower polydispersity index (PDI) than obtained without temperature control. Preferably the PDI of the polymers of this invention is less than 3, more preferably less than 2, and most preferably less than 1.5.

One suitable plug-flow, temperature-controlled reactor is a stirred tubular reactor (STR). Any type of reactor, or combination of reactors, in which a reaction mixture can move through in an essentially plug flow manner is also suitable. Combinations of STRs, including combinations with extruders, are also suitable. Regardless of the type of reactor chosen, the temperature or temperature profile of the reactor is preferably controllable to the extent that a plug of the reaction mixture in a particular location within the reaction zone (i.e., the portion of the reaction system where the bulk of polymerization occurs) at time $t_1$ will have essentially the same temperature or temperature profile as another plug of the reaction mixture at that same location at some other time $t_2$. The reaction zone can include more than one temperature-controlled zone of the reactor. STRs may provide for essentially plug flow of the reaction mixture and can be configured such that good temperature control can be attained, and are therefore useful in getting the average molecular weight of the polymer product to remain close to a target value, i.e., have a narrow polydispersity range.

As used herein:

"continuous" means that reactants enter a reactor at the same time (and, generally, at the same rate) that polymer product is exiting the same reactor;

"polydispersity" means the weight average cell diameter divided by the number average cell diameter; polydispersity is reported on a polydispersity index (PDI);

"living anionic polymerization" means, in general, a chain polymerization that proceeds via an anionic mechanism without chain termination or chain transfer. (For a more complete discussion of this topic, see *Anionic Polymerization Principles and Applications.* H. L. Hsieh, R. P. Quirk, Marcel Dekker, NY, N.Y. 1996. Pg 72–127);

"living end" means an anionically-polymerizable reactive site;

"temperature-sensitive monomer" means a monomer susceptible to significant side reactions of the living ends with reactive sites, such as carbonyl groups, on the same, or a different, polymer chain as the reaction temperature rises;

"starbranched polymer" means a polymer consisting of several linear chains linked together at one end of each chain by a single branch or junction point (See *Anionic Polymerization Principles and Applications.* H. L. Hsieh, R. P. Quirk, Marcel Dekker, NY, N.Y. 1996. Pg 333–368);

"branching agent" means a multifunctional anionically polymerizable monomer or multifunctional quenching or coupling agent, the addition of which results in the formation of starbranched polymer;

"block" means the portion of a polymer chain in which all the neighboring monomer units (except at the transition point) are of the same identity, e.g., AAAAAABBBBBB is a diblock copolymer comprised of A and B monomer units;

"segment" refers to a block of polymer formed by the addition of a specific monomer or a branching agent;

"functional site" means a reactive site other than an anionically-polymerizable site;

"protected functional group" means a functional unit that is reactive after the removal of a "protective" group that prevents reaction at a particular site;

"functional quenching agent" or "$A_{fn}$" means a reactive moiety containing a protected functional group capable of quenching or terminating an anionically produced polymer chain; it becomes attached to the end of said chain;

"quenching agent" or "$A_n$" means a reactive moiety capable of quenching or terminating an anionically produced polymer chain; it becomes attached to the polymerizing end of said chain; this agent may be multifunctional in nature, thus capable of quenching multiple chains, thereby producing a star-like macromolecule;

"plug" means a three dimensional slice of the reaction mixture;

"residence time" means the time necessary for a theoretical plug of reaction mixture to pass completely through a reactor;

"reaction zone" means that portion of a reactor or reactor system where the majority of reaction occurs; and "temperature profile" means the temperature or temperatures experienced by a reaction mixture plug over time as it moves through a reactor (For example, if the temperature is constant through the reactor, the temperature profile will have a zero slope; if the temperature increases through the reactor, the profile will have a positive slope);

An advantage of at least one embodiment of the present invention is that the temperature of the reaction mixture can be controlled to such an extent that side reactions are minimized, thereby providing a product with a narrow polydispersity. This is especially advantageous when temperature-sensitive monomers are used.

Another advantage of at least one embodiment of the present invention is that the average molecular weight of resulting polymers can be controlled well by controlling the amount of initiator added to the reaction mixture.

Another advantage of at least one embodiment of the present invention is that various polymer architectures can be tailored and synthesized to be suitable for specific applications.

Another advantage of at least one embodiment of the present invention is that the ability to control the temperature enables the reaction materials to be maintained in solution, which facilitates the desired reaction.

Other advantages of at least one embodiment of the present invention is that it allows for controlled reaction kinetics, optimum reaction mixture viscosity and polymer solubility.

DETAILED DESCRIPTION

Figure 1:
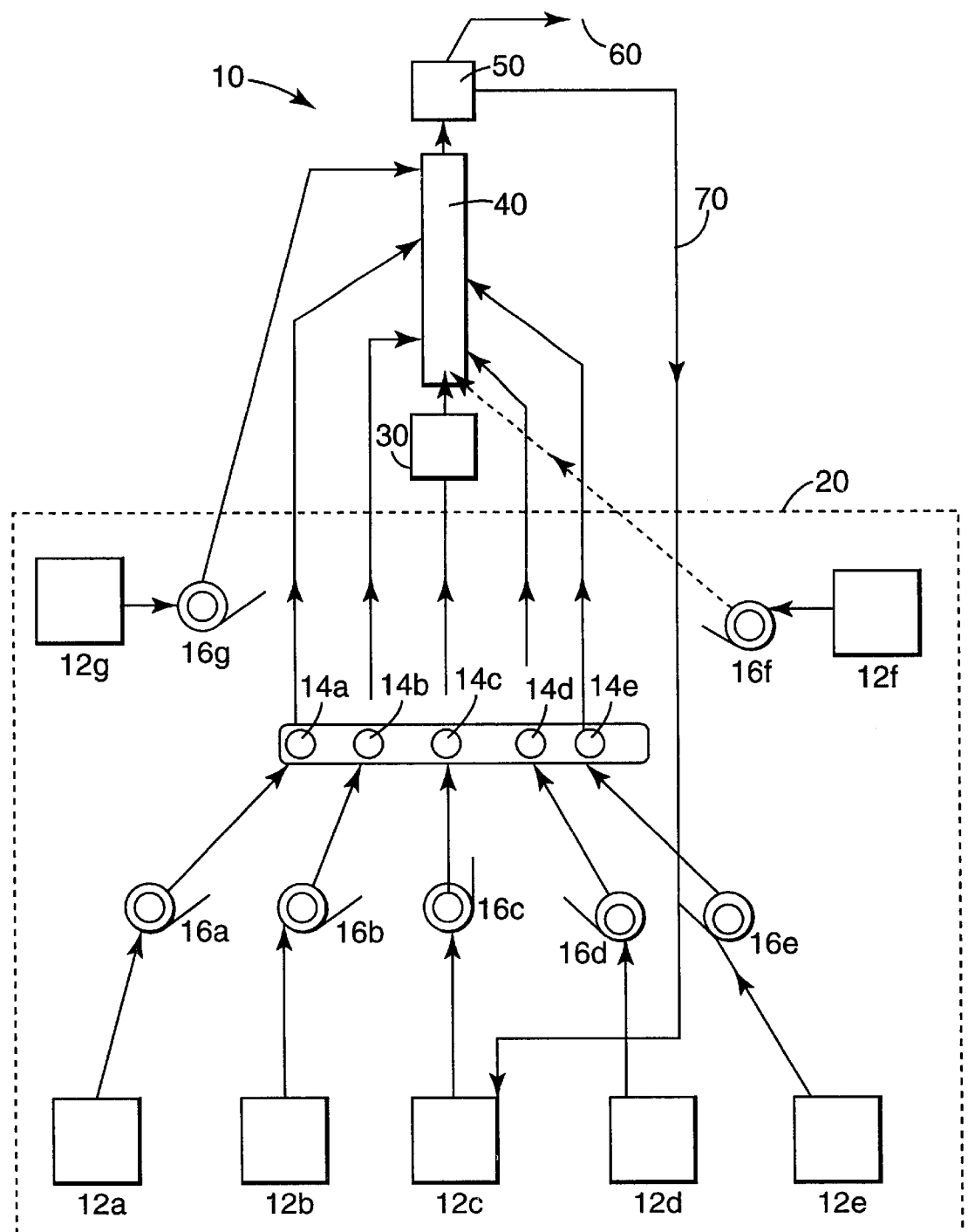
FIG. 1 is a schematic representation of an exemplary reaction system useful for carrying out the polymerization process of the present invention.

Referring to FIG. 1, reaction system 10 includes reaction mixture delivery system 20, optional heat exchanger 30, reactor 40, optional devolatilization mechanism 50, outlet 60, and optional recycle stream 70, which allows residual solvent to be recycled through the system. Reaction mixture delivery system 20 comprises component feed supply units 12a–12g, purification units 14a–e, and pumps 16a–16g. The manner in which these elements are combined and controlled helps to provide, consistently over time, control over the average molecular weight distribution of the polymer produced by the described process. The polydispersities of the resulting polymers can be minimized. Polydispersity indexes of less than 3, preferably less than 2, most preferably less than 1.5 may be achieved. These low polydispersities can be achieved because the reaction system provides good mixing conditions in addition to providing a controlled temperature, which limits side reactions. Monomer to polymer conversions typically greater than 90%, 99% and up to 100% can also be achieved. Accordingly, the resulting polymerized material (solids loading) is usually comparable to the monomer weight percent concentration.

A. Reaction Mixture

In the polymerization process of the present invention, at least one anionically polymerizable monomer, an initiator system and solvent are present in the reaction mixture. The function of the initiator system is to generate anions in the presence of the monomer. The function of the solvent system is to facilitate mobility of the monomers, initiator system, and the polymer produced as well as serving as a partial heat sink.

Anionically-polymerizable monomers are those that generally have a terminal unsaturated carbon-carbon bond. Examples include vinyl aromatics, styrenics, dienes, vinyl pyridines, alkyl methacrylates, epoxides (e.g., ethylene and propylene oxide), oxiranes, cyclic sulfides (e.g., thiiranes), lactones, lactides, cyclic carbonates, lactams, cyclosiloxanes (e.g., hexamethyltrisiloxane), ethylene oxide, acrylonitrile, and [n]metallocenophanes as well as anionically-polymerizable polar monomers. Suitable vinyl aromatic monomers include; styrene, α-methylstyrene, p-methylstyrene, methyl-4-styrene, methyl-3-styrene, ethyl-4-styrene, dimethyl-3,4-styrene, trimethyl-2,4,6-trimethylstyrene, tert-butyl-3-styrene, dichloro-2-6-styrene, vinyl naphthalene, and vinyl anthracene. Polymerizable dienes include, for example, isoprene, isoprene-derivatives, butadiene, and 1,3-pentadiene. Anionically-polymerizable polar monomers include, for example, vinyl pyridine, vinyl pyridine derivatives, 2-vinyl pyridine, and 4-vinyl-pyridine, t-butyl acrylate and methacrylic monomers such as tert-butyl methacrylate, methyl methacrylate, isodecyl methacrylate, n-$C_{12}H_{25}$, n-$C_{18}H_{37}$, allyl methacrylate, and glycidyl methacrylate.

The vinyl pyridine materials produced by the present invention are typically synthesized at temperatures where competitive alkylation at the 2-position of the pyridine ring system can occur, resulting in chain-chain coupling as well as increases in molecular weight and polydispersity. Typically vinyl pyridine is polymerized at low temperatures (e.g., −78° C.) in tetrahydrofuran (THF), Luxton et. al., *Polymer* 1978, 19, 1320 and Klein, J. W.; Lamps, J.-P.; Gnanou, Y.; Rempp, P. *Polymer* 1991, 32, 2278.

Suitable monomers include those that have multiple reaction sites. For example some monomers may have at least two anionically-polymerizable sites. This type of monomer will produce branched polymers. This type of monomer preferably comprises less than 10 molar percent of a given reaction mixture because higher amounts tend to lead to a high degree of crosslinking in addition to branching. Another example is a monomer that has at least one functionality that is not anionically-polymerizable in addition to at least one anionically polymerizable site. Such functionalities are known in the art and include those that are reactive by the following mechanisms: condensation, ring opening, nucleophilic displacement, free radical coupling, photolytic coupling, and hydrosilylation.

Anionically-polymerizable polar monomers are generally temperature sensitive. These monomers tend to undergo a significant number of side reactions under adiabatic polymerization conditions unless the initial temperature of the reaction mixture is relatively cold, typically well below 40° C., and more commonly below 0° C. Without a temperature-controlled system, the initial temperature typically must be this low to avoid having the exothermic reaction result in a temperature so high that it causes significant side reactions. The side reactions typically involve the living end of the polymer reacting with another reactive site, such as a carbonyl group, within the chain of the same polymer or within a different anionically-polymerizable polymer. These side reactions generally result in an undesirable broadening of the polydispersity of the organic material that is formed.

An advantage of the process of the present invention is that polymer architectures, including those with temperature sensitive monomers, can be made with narrow polydispersities at temperatures preferably between 10° C. and 80° C., more preferably −20° C. to +70° C., and most preferably, between 0° C. and 30° C. Because the present invention allows temperature control of the system, the initial temperature of the reaction mixture can be maintained at or near the desired temperature throughout the reaction. The reaction mixture can initially be at room temperature or at another desired temperature instead of starting at a low temperature and ending at a high temperature after the exothermic reaction.

The organic material product of the present invention can be formed from temperature sensitive monomers, non-temperature sensitive monomers, or a combination of one or more type of temperature sensitive monomer and one or more type of non-temperature sensitive monomer. The temperature sensitive polymer may be at any location in the organic material.

Initiators particularly useful with specific monomers are well known in the art. Initiators compatible with the exemplary monomer systems discussed herein are summarized in Hsieh et al., *Anionic Polymerization: Principles and Practical Applications,* Ch. 5, and 23 (Marcel Dekker, New York, 1996). For example, for vinyl pyridine, preferred initiators include n-butyl lithium, sec-butyl lithium, tert-butyl lithium, fluorenyl lithium, naphthyllithium, phenyllithium, and p-tolyllithium.

As another example, for alkyl methacrylate, preferred initiators include less reactive initiators, due to their decreased propensity to react with ester carbonyl groups, such as 1,1-diphenylhexyllithium or other carbanions of diphenylmethane and oligomeric α-methylstyryl monomers such as α-methylstyrene-lithium. The anionic polymerization of alkyl methacrylates is typically conducted in THF at low temperatures (e.g., −78° C.). However, with the addition of additives such as lithium chloride and lithium t-butoxide, some room temperature polymerizations may be done. Some methacrylate reactions (e.g., glycidyl methacrylate) are not hindered by the polymerization of materials that contain functional groups. Other polymerizable methacrylate systems include n-, iso-, sec- and t-butyl magnesium bromide, t-butyl lithium with triethyl, tributyl, triisobutyl, or troocty-laluminum in toluene at −78° C., aluminum porphyrin compounds in methylene chloride solvents at a range of temperatures (−90° C. to −20° C.), cumyl cesium in THF at up to 20° C., and lithium ester enolates of ethyl isobutyrate in toluene at 20° C. with lithium t-butoxide added lithium chloride. α-Methylstyryl-lithium, and 1,1-diphenylhexyllithium are the preferred initiators for alkyl methacrylates in THF, cylclohexane, or toluene. Use of initiators and solvents for the monomer systems discussed herein is summarized in Hsieh et al., *Anionic Polymerization: Principles and Practical Applications,* Ch. 5, and 23 (Marcel Dekker, New York, 1996).

The anionic polymerization of methacrylates can often be accompanied by side reactions such as chain transfer, back-biting, and termination. These phenomena may be suppressed by lowering reaction temperature's or by selective synthetic modification of growing polymer chain ends with 1,1-diphenylethylene to induce more efficient methacrylate initiation.

The ratio of initiator to monomer determines the average molecular weight of the resulting polymer. Because the polymerized monomers of the present invention have "living" ends, subsequent monomers may be added without additional initiators, e.g., when a block copolymer is being made.

Solvents compatible with specific monomers are well known in the art. Solvents compatible with the exemplary monomer systems discussed herein are summarized in Hsieh et al., *Anionic Polymerization: Principles and Practical Applications*, Ch. 5, and 23 (Marcel Dekker, New York, 1996). One or more solvents can be used as a reaction solvent system. The amount of solvent is preferably sufficient to solubilize the reaction components (including additional monomer added downstream) and the resulting product. Preferably the solids loading of the monomers in the solvent is 10 to 50 weight %. When monomers are polar, preferred solvents include benzene, ethylbenzene, cyclohexane, toluene, tetrahydrofuran and xylene. Co-solvents such as dialkyl ethers, (diethyl ether, dibutyl ether), tetrahydrofuran, or tetramethylene diamine may also be used for both polar and nonpolar monomer systems.

The invention allows the synthesis of homopolymers, random copolymers, block copolymers, starbranched homo-, random, and block copolymers, and end-functionalized polymers via living anionic solution polymerizations.

In living systems, polymerization can be initiated by reaction of an anionic source (e.g., initiator), with anionically polymerizable monomers. These reactions are typically highly exothermic and air/moisture sensitive reactions. They generally proceed until all residual monomer is consumed. Upon complete monomer consumption, the "living" and hence reactive chain may be quenched or treated with the same monomer at a later point along the reactor profile to form higher average molecular weight homopolymers. These anionically produced "living" chains can also serve as precursors to a number of different polymer architectures.

An example of such a living system comprises mixing an alkyl lithium reagent as an anionic source with anionically polymerizable monomers, such as styrene or isoprene, in the first zone of reactor 40. The highly exothermic and air/moisture sensitive reaction proceeds when the alkyl lithium reagent and styrene form a styryl anion. This anion then reacts with additional styrene monomers resulting in the formation of a "living" polystyrene chain, until all residual monomer is consumed. Upon complete monomer consumption, the "living" and hence reactive polystyrene chain may be quenched or treated with further styrene monomer to form a higher average molecular weight homopolymer at a later point along the reactor profile. The "living" polystyryl chains can also serve as precursors to a number of different polymer architectures.

Mixing different types of monomers in the first zone of reactor 40 can produce random copolymers, formed by random initiation and propagation of the constituent monomers.

Mixing the living chains with another anionically polymerizable monomer results resumption of polymerization and the formation of a new block in a resulting block copolymer. For example, mixing isoprene monomer with a living polystyrene chain can cause a polyisoprene block to grow from the end of the previously formed polystyrene chain. Further monomer addition in subsequent zones can result in multi-block systems.

Star or hyperbranched materials can be synthesized by addition of difunctional reagents to living anionic polymerizations. The difunctional monomers can couple polymer chains resulting in branching further polymerization. Alternatively living anionically produced chains can be coupled by multifunctional or multisite quenching agents to produce starbranched materials. Suitable difunctional reagents include divinyl benzene (DVB), vinylbenzyl chloride and dimethacrylic monomers such as hexanediol dimethacrylate (HDDMA), which may be used as comonomers for the production of starbranched materials.

End-functionalized materials can be synthesized by adding reagents which contain reactive halogen or unsaturated groups capable of quenching a "living" anionic polymerization as described above. Anionic polymerizations are not readily amenable to the polymerization of monomers containing relatively acidic, proton donating groups such as amino, hydroxyl, thiol, carboxyl or acetylene functional groups. These groups can be included, once incorporated in functional quenching agents ($A_{fn}$), if protected by the use of suitable protecting groups that are stable to the conditions of anionic polymerization and can be readily removed by post polymerization treatments. Suitable quenching agents include oxygen, water, hydrogen, steam, alcohols, ketones, esters, amines, hindered phenols, etc. Suitable functional quenching agents include chlorosilanes ($ClSiMe_2NMe_2$, $ClSiMe_2OR$, $ClSiMe_2H$) 1,3-bis(trimethylsilyl) carbodiimmide, and 1-(3-bromopropyl)-2,2,5,5-tetramethyl-1-aza-2,5-disilacyclopentane.

Quenching agents with multiple reactive sites may be used to couple two living polymer chains thereby increasing average molecular weight. Suitable multifunctional or multisite quenching agents include dimethyl phthalate, phosphorus trichloride, methyltrichlorsilane, silicon tetrachloride, hexachlorodisilane, and 1,2,3-tris(chloromethyl)benzene, dichlorodimethylsilane, dibromo-p-xylene, dichloro-p-xylene, bischloromethylether, methylene iodide, 1-4-dibromo-2-butene, 4-diiodo-2-butene, and 1,2, dibromoethane.

In addition to the basic reaction mixture components, other compounds that can modify the properties of the polymer product can be introduced into the reactor. For example, one or more of preformed polymers, inert tackifiers, pigments, and fillers can be added to the reaction mixture. Polymer adhesive properties (e.g., peel and shear) or modulus characteristics can be modified by addition of tackifiers or clays/silica respectively.

B. Purification and Delivery to Reactor

A system for making organic material per the present invention is exemplified by FIG. 1. As the figure shows, initially monomer(s) and solvent(s) are impelled from one or more of feed supplies 12a–12e to purification units 14a–14e via pumps 16a–16e and then into reactor 40. In most instances, initiator(s) and quenching agent(s) may be fed directly from feed supplies 12f and 12g, respectively, to reactor 40, for example, by pumps 16f and 16g, without passing through a purification unit 14. Because initiators can be air-sensitive, it may be desirable to feed the initiator directly to the reactor to avoid excess processing that could introduce air into the initiator supply. Quenching agents typically do not need to be purified because the presence of contaminants should not affect their functioning properly. The number of pumps and the configuration of the system, e.g., whether a purification unit is needed, will depend on the number and types of monomers being used. Some components that may be in the reation mixture such as alkyl lithium reagents, which may be used as initiators, are notoriously sensitive to a variety of deactivating species including, inter alia, $H_2O$ and $O_2$. Therefore, when sensitive reagents are used, care must be taken to remove or exclude such deactivating species from the monomer(s), solvents, and any additives. This removal is performed by purification units 14a–14e.

Preferred purification methods include sparging the monomer(s) with an inert gas (e.g., $N_2$) and passing the combined stream of the monomer(s) and any solvent to be used in the initiator solutions through one or more purification columns. Such columns are packed with particles that selectively remove dissolved deactivating species. For example, molecular sieves and a variety of desiccants can remove $H_2O$ while activated copper can remove $O_2$ from fluids coming into contact therewith. Those skilled in the art are aware of the importance of removal of $H_2O$ and $O_2$ from reaction mixture components as well as numerous ways of accomplishing the same. Low water and oxygen concentrations, i.e., below 10 ppm, ensure that very little initiator or "living" polymer chain is deactivated. Polymerization inhibitors may be removed from monomers by treatment with basic alumina ($Al_2O_3$) chromatographic materials, as is known in the art. Initiator(s), monomer(s), and solvent(s) are then mixed at the inlet of reactor 40 or are introduced through separate inlets and mixed at some point downstream from the inlet end of reactor 40.

Initially, reaction mixture components (typically monomer(s), solvent(s), and initiator(s)) are impelled from component feed supply units, e.g., 12b, 12c, and 12d for the monomer/solvent mixture and 12f for the initiator by pumps 16b, 16c, 16d, and 16f, respectively. Other monomers, branching agents, functional quenching agent ($A_{fn}$), quenching agent ($A_n$) and solvents can be added to the reactor 40 at some point further downstream from where the initial charge of monomers. For example, additional solvents and monomers may be added from component feed supply units 12a and 12e via pumps 16a and 16e, respectively. The feed supplies will pass through a corresponding purification unit 14, if present in the system.

Although a pressure feed (i.e., a pressurized tank with a control valve) can be used for each component, the components preferably are impelled by pump mechanisms. A wide variety of pump designs can be useful in the present invention as long as the pump seal is sufficient to exclude oxygen, water, and other initiator deactivating materials from feed supply units 12a–12g. Examples of potentially useful pumps include gear pumps, diaphragm pumps, centrifugal pumps, piston pumps, and peristaltic pumps.

Some initiator systems are delivered to reactor 40 in the form of a slurry, i.e., a suspension of small particles in a solvent. For example, butyl lithium can be mixed in cyclohexane for use with diene and vinyl aromatic monomers. Such slurry initiator systems can settle in feed supply unit 12f and in pump 16f unless care is taken. A mechanism to keep the initiator system well mixed in feed supply unit 12f is preferred. Examples of such mechanisms include multiple agitator blades and a pump-around loop. Additionally, such initiator systems can be impelled to reactor 40 by a pump 16f, that can easily handle slurries. Examples of suitable pumps include peristaltic and diaphragm pumps. Tubing used to transport the reaction mixture components to reactor 40 from 12a–g must be capable of handling high pressure and of substantially excluding materials capable of deactivating the initiator being used, e.g., water and oxygen. Useful tubing materials include stainless steel, polypropylene, polyethylene, and polytetrafluoroethylene. When a peristaltic pump is used as one of pumps 16a–16g, the tubing preferably is a fluoroelastomer.

The rate at which pumps 16a–16g impel the reaction mixture components to reactor 40 can be adjusted so the residence time of the reaction mixture in reactor 40 is at or near a desired length. Typical residence times for 10 and 20 Liter (L) STRs range from as low as five minutes up to about 60 minutes, preferably from about 10 minutes to about 50 minutes, more preferably from about 20 to about 40 minutes, most preferably about 30 minutes. Of course, feed rates and reaction mixture component concentrations can vary with reactor type and degree of polymerization desired.

C. Reactor

Reactor 40 can be any type of reactor or reactor design that allows for essentially plug flow of a reaction mixture having a solids loading of 10 to 50 weight %, as well as allowing temperature control of the reaction mixture. The reactor preferably has multiple downstream feed stream injection points. STRs are preferred. The ability to add reagents at numerous points along the reaction pathway in a STR makes the STR well suited for specifically functionalizing the end group structure of a polymer. The type of reactor used should be such that the residence time thereof is no more than about 300 minutes, preferably no more than about 60 minutes, more preferably no more than about 45 minutes, most preferably no more than about 30 minutes. Shorter residence times can result in less waste during changeover (i.e., a change in the type(s) of monomer(s), solvent(s) or initiator(s) being used, the ratio of monomers, the amount(s) of initiator(s), the targeted average molecular weight, etc.) and a substantially reduced response time to process condition changes. Preferably the reactor has four or more independently temperature controlled zones. A reactor with a single temperature-controlled zone may be used but, if fewer than about four zones are used, the molecular weight polydispersity of the resulting organic material tend to be wider than desired. Notwithstanding the foregoing, when a homopolymer is being made, the reactor preferably has at least two independently temperature controlled zones.

Prior to being used in the process of the present invention, reactor 40 may be sweetened. Commonly sweetening is accomplished by filling reactor 40 with a dilute solution of initiator and allowing it to stand for, e.g., about 24 hours. Thereafter, a gaseous sparge and suitable anhydrous solvent can be used to remove the sweetening mixture.

Reaction mixture components can be delivered from purification unit 14 and the initiator feed storage unit 12g to reactor 40 by means of pressure created by pumps 16a–16g. Before reaching reactor 40, the reaction mixture components optionally can pass through heat exchanger 30.

Optional heat exchanger 30 is used when reactor 40 is to be run at a temperature above or below the temperature of the reaction mixture components prior to being introduced into reactor 40. For example, where the first section of reactor 40 is maintained at or near a temperature of 50° C., the reaction mixture preferably enters the first section of reactor 40 at or near 50° C. Where the reaction mixture components are individually maintained near room temperature (e.g., approximately 25° C.), optional heat exchanger 30 can be a preheater that raises the temperature of the combined reaction mixture components to approximately that of the first section of reactor 40. Typically, the monomer is initially at room temperature prior to entering the reactor.

Reactor 40 can be surrounded by a jacket containing a circulating heat transfer fluid (e.g., water, steam, liquid nitrogen, etc.) wich serves as the means to remove heat from or add heat to reactor 40 and the contents thereof. To aid in this temperature control, temperature sensing devices (e.g., thermometers and/or thermocouples) can extend into reactor 40 to measure the temperature of the reaction mixture passing thereby. Based on the output of the temperature sensing devices, the temperature and circulation rate of the heat transfer fluid contained in the jacket can be adjusted manually or automatically (e.g., by means of a computer controlled mechanism).

Additionally, at least a portion of reactor 40 can be enclosed by a shroud. Between the exterior of reactor 40 and the shroud is maintained an environment that effectively prevents ignition of any flammable or combustible materials that might be present in or near reaction system 10. Use of such a shroud (and the environment permitted thereby) allows general purpose electrical devices (e.g., standard heaters and motors) to be used in or with reaction system 10. Such general purpose devices often are more conducive to maintaining a desired temperature profile or producing essentially plug flow movement of the reaction mixture than are devices with higher safety ratings. Shrouded reactors are more fully described in U.S. Pat. Nos. 5,814,278, and 5,882,604, which description is incorporated herein by reference.

By dividing reactor 40 into sections and individually controlling the temperature of each section, the reaction mixture can be made to encounter a temperature profile. For example, each section of reactor 40 can be maintained at the same (or nearly the same) set temperature, thus ensuring that the reaction mixture encounters a steady temperature profile. This can be done by having separate jackets around each section or having some other means to independently control the temperature of each section. Cyclic temperature profiles also are possible. Alternatively, each successive section of reactor 40 can be maintained at a temperature higher (or lower) that the previous section, thus ensuring that the reaction mixture encounters a rising (or falling) temperature profile.

The temperatures at which the zones are maintained will depend on the materials being used and the reaction desired, but in general, the system is operated at temperatures between 10° C. and 80° C., preferably −20° C. to 70° C., most preferably 0° C. to 30° C. The range of −20° C. to 30° C. is most preferable when polar monomers are being used. For a given reaction the temperature of the reaction mixture is usually maintained within a range narrower than these operating ranges. For example, in Example 4, infra, the temperature of the reaction mixture ranged between 53° C. and 40° C. The objective of controlling the temperature of each section is to ensure that the temperature of the reaction mixture is at a temperature that is conducive to the desired reaction and will not promote unwanted side reactions. If a reactor were long enough it is possible that the reaction mixture temperature could be adequately controlled with a single jacketed zone; however, such a system would be not be particularly efficient.

If desired, during the course of an ongoing polymerization, the temperature profile can be changed by changing the temperature of one or more sections. Changing the temperature profile is one way to affect the molecular weight distribution of an organic material for which the polymerization behavior of the monomers can be altered by temperature. Such monomers include methacrylate and vinyl pyridine systems. For example, when a reaction is exothermic, side reactions that can result in polymers with varying molecular weights can be limited by controlling the temperature of the reaction mixture. Typically, the temperature of the reaction mixture will increase whenever monomer is added and polymerization takes place. Therefore, an exothermic reaction may occur when a first monomer is initially fed into the reactor. Another exothermic reaction may occur downstream when a second monomer is added after the first monomer is partially or fully converted and the mixture may have cooled from the initial reaction.

In addition to temperature control, an essential feature of reactor 40 is the capability to impel, from the input end of reactor 40 to its output end, in an essentially plug flow manner, the reaction mixture contained therein. By "essentially plug flow" is meant that eddies and dead spots, where reaction mixture can be delayed in its path through reactor 40, and short circuits to the reactor outlet, which allow the reaction mixture to pass too quickly through reactor 40, are virtually nonexistent. This means that a given segment of a reaction mixture continues down the length of reactor 40 with about the same velocity profile as a segment traveling therethrough either earlier or later. The manner in which a reaction mixture is impelled through reactor 40 can be by an external means such as a pressure feed (e.g., a pump) or by an internal means (e.g., a screw in an extruder). Plug flow can be assisted by lateral mixing means (e.g., radial paddles in an STR). The reaction mixture preferably has a monomer concentration of 10 to 50 weight percent, and more preferably has a concentration of 25 to 45 weight %. These concentrations allow the reaction mixture to be more easily impelled downstream as polymer forms and increases the viscosity of the reaction mixture.

A preferred embodiment of reactor 40 is a stirred tubular reactor (STR), which may consist of a series of cylinders joined together to form a tube. Down the center of this tube, the STR may have a shaft having a plurality of paddles radiating therefrom extends along the primary axis of the tube. (Each cylinder can be jacketed as described previously.) As an external drive causes the shaft to rotate, the paddles stir the reaction mixture and assist in heat transfer. In addition, the paddles can be designed such that they assist the pumps and/or pressure head feed systems in propelling the reaction mixture through the tube. The design of STRs are known to those of skill in the art.

The tube can have a volume ranging from a fraction of a liter to several hundred liters or more depending on the number and radii of the cylinders used. The cylinders can be made of glass, tempered glass, various stainless steels, glass-lined steel, or any other material that is nonreactive with a reaction mixture passing therethrough, can exclude potential initiator deactivating materials (e.g., atmospheric $O_2$ and $H_2O$) from the interior reaction zone, can transfer heat, and can withstand elevated pressure. Preferred materials include 316 L stainless steel and low coefficient of expansion-type glass (e.g., PYREX glass, available from Corning Glass Works; Corning, N.Y.). The cylinders can be joined by means of various types of gaskets and flanges. Although the tube can be horizontal or angled, it preferably is angled upward from its input end to its output end so as to ensure that any inert gas in the STR can escape through the outlet.

The shaft can be made from a variety of inert metals, preferably stainless steel. Where a corrosive initiator such as alkyllithium is to be used in the STR, the shaft preferably is made from a corrosion resistant stainless steel (e.g., 316 L stainless steel).

Where the shaft is hollow, it can be cooled (if desired). This can be accomplished by running a heat transfer fluid, such as water, through it.

To assist in maintaining essentially plug flow through an STR, the paddles can be designed so as to minimize reaction mixture build-up on the paddles and shaft. Build-up often occurs in stagnant regions, which are normally located on the walls of the tube or on the downstream surfaces of paddles, and can result in reduced heat transfer and plugging of the STR. This is of particular importance in polymerizations involving 2- and 4-vinyl pyridine, because the block polymerization of these materials with styrenic or diene monomers produces organized or micellar materials which can be difficult to stir or can settle on reactor walls. Because STRs are cleaned less frequently than batch reactors (and because long term continuous operation is desirable), build-up can result in a loss of residence time. Having to rid an STR of build-up can result in a loss of production time and the introduction of solvents into the STR can deactivate catalyst during future runs. Build-up and the problems resulting therefrom can be minimized by proper paddle design.

Optimization of paddle design can involve the use of cylindrical and/or streamlined designs as well as providing for narrower wall clearances toward the outer end of the STR. (See the Examples section for a description of a preferred type of paddle configuration.) Use of paddles with flexible tips (e.g., made from an elastomer such as polytetrafluoroethylene) can assist in scraping the walls of the tube. Alternatively, build-up can be minimized by periodically alternating the direction of paddle rotation. Direction can be alternated every few seconds or minutes (or whatever time frame seems to best inhibit build-up with a particular reaction mixture).

Where a gaseous monomer is used, the STR tube preferably is made from a very strong material (e.g., stainless steel) that can withstand the elevated pressure necessary to assure solubility of the gaseous monomer.

Yet another preferred embodiment of reactor 40 is a combination system where the output of an STR is pumped into the front end of an extruder. Such a combination system can take a partially converted reaction mixture exiting an STR and allow for further conversion in an extruder upon addition of a further aliquot of monomer or by addition of a new monomer. Because the reaction mixture being fed into the extruder is already fairly viscous (e.g., usually 20,000 to several million centipoise), the need for a pressurized feed is eliminated. In such a combination system, the STR output is fed to the extruder through a heated line, preferably one that is very short (e.g., up to about three feet).

STRs and combinations of STRs and extruders have been mentioned as examples of useful designs for reactor 40. They are meant to be merely illustrative. Other designs with insubstantial differences (e.g., those that allow for essentially plug flow and temperature control of a mixture with a monomer concentration of 10 to 50 weight %) are within the scope of the present invention when used as reactor 40.

D. Quench

Where an STR is used alone as reactor 40, a quench solution may be added to the reaction mixture soon after it exits reactor 40. This can be accomplished by blending the reaction mixture and quench feeds (not shown) through a simple T-pipe arrangement. To ensure thorough mixing of the two feeds, the combined feed can be fed into another mixer (e.g., a static mixer).

Those skilled in the art are aware of the wide variety of materials that can be used to quench various initiator systems. Commonly used examples include oxygen, water, steam, alcohols, ketones, esters, amines, hindered phenols, etc.

E. Thermal Stabilizer

Where the polymer and/or the reaction mixture is to be processed at elevated temperatures (e.g., high temperature devolatilization of the reaction mixture or hot-melt coating of the polymer), addition of a thermal stabilizer to the reaction mixture is preferred. A variety of thermal stabilizers, including hindered phenols and phosphites, are widely used in the industry. Whichever stabilizer is used, it is preferably soluble in the monomer and polymer; otherwise, a solvent will be necessary as a delivery mechanism.

In the instance where a hindered phenol has been used as the quenching agent, addition of a separate thermal stabilizer may be unnecessary.

F. Devolatilization

Where the polymer product is to be used in pure form (i.e., not mixed with monomer), unreacted monomer can be stripped out of the reaction mixture by optional devolatization mechanism 50. A variety of known devolatilization processes are possible. These include, but are not limited to, vacuum tray drying on, for example, silicone-lined sheets; wiped film and thin film evaporators (when the average molecular weight of the polymer is not too high); steam stripping; extrusion through a spinneret; and air drying.

A preferred type of devolatilization mechanism 50 is a DISCOTHERM B high viscosity processor (List AG; Acton, Mass.). Other manufacturers such as Krauss-Maffei Corp. (Florence, Ky.) and Hosokawa-Bepex (Minneapolis, Minn.) make similar processors. These types of processors have been found to be efficient in separating polymer product from the remainder of the quenched reaction mixture. If desired, such processors can be maintained at below ambient pressures so that reduced temperatures can be used. Use of reduced pressures permit the recapture of very volatile components without extensive degradation of the polymer.

The remaining components of the reaction mixture (i.e., solvent(s), and any quench solution that was used) can be disposed of or recycled. The latter option requires that, once condensed, they be separated from each other. This commonly is done by means of distillation; thus, the use of solvent(s) with boiling points that differ significantly from those of the quenching agent solution is preferred. Recycled solvent passes through purification unit 14 prior to being reintroduced into reactor 40.

G. Collection of Polymer

Once the polymer product has been isolated from the remainder of the reaction mixture, it can be collected directly from outlet 60 in a desired container.

Objects and advantages of this invention are further illustrated by the following examples. The particular materials and amounts thereof, as well as other conditions and details, recited in these examples should not be used to unduly limit this invention.

EXAMPLES

Test Methods

Molecular Weight and Polydispersity

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter. Then about 150 microliters ($\mu$L) of the filtered solution was injected into a Plgel-Mixed B column (available from Polymer Labs, Amherst, Mass.) that was part of a GPC system also having a Waters 717 Autosampler and a Waters 590 Pump. The system operated at room temperature, with a THF eluent that moved at a flow rate of approximately 0.95 mL/min. An Erma ERC-7525A Refractive Index Detector was used to detect changes in concentration. Number average molecular weight ($M_n$) and polydispersity index (PDI) calculations were based on a calibration mode that used narrow polydispersity polystyrene controls ranging in molecular weight from $6 \times 10^6$ to $600 \times 10^6$. The actual calculations were made with Caliber software available from PolymerLabs.

Block Concentration

The concentration of each block was determined by Nuclear Magnetic Resonance (NMR) spectroscopy analysis. A sample was dissolved in deuterated chloroform to a concentration of about 10 wt. % and placed in a Unity 500 MHz NMR Spectrometer available from Varian, Palo Alto, Calif. Block concentrations were calculated from relative areas of characteristic block component spectra.,

| Materials Used | |
|---|---|
| Material | Description |
| isoprene | Available from Aldrich Chemical Co., Milwaukee, Wisconsin. |
| styrene | Available from Ashland Chemical, Columbus, Ohio. |
| 4-vinyl pyridine | Available from Reilly Industries, Indianapolis, Indiana. |
| t-butyl methacrylate | Available from Sans Bsters Corp., New York, New York. |
| isodecyl methacrylate | Available from Ciba Speciaty Chemicals Corp., Water Treatments Div., Suffolk, Virginia. |
| glycidyl methacrylate | Available from Sartomer, Exton, Pennsylvania. |
| diphenylethylene | Availabie from Acros/Fisher Scientific, Itasca, Illinois. |
| divinylbenzene | Available from Aldrich Chemical Co. |
| sec-butyl lithium | An anionic initiator, 1.3 Molar in cyclohexane, available from Aldrich Chemical Co. |
| n-butyl lithium | An anionic initiator. 2.5 Molar in hexane, available from Aldrich Chemical Co. |
| Toluene | Available from Worum Chemical, St. Paul, Minnesota. |
| THF | Available from ISP Technologies, Wayne, New York. |
| Irganox 1076 | Available from Ciba Speciaty Chemicals Corp. Tarrytown, New York. |

Monomer Preparation and Handling

The reactant monomers in the following examples (isoprene, styrene, vinyl pyridine, t-butyl methacrylate, isodecyl methacrylate, glycidyl methacrylate, diphenylethylene and divinylbenzene) were nitrogen sparged until the $O_2$ concentration was less than 1 part per million (ppm). Deoxygenated monomer was pumped through a column (l=50 cm, d=2 cm) of basic alumina ($Al_2O_3$, Aldrich, Brockmann I, about 150 mesh, 5.8 $\mu$m). The purified monomer was then fed directly to a stirred tubular reactor (STR). Reaction solvents (either toluene, cyclohexane or a mixture) were pumped through molecular sieve beads (available as Zeolite 3A from UOP, Chickasaw, Ala.) and fed directly to the STR. In isoprene-based examples where a THF co-solvent was used, the THF also was deoxygenated by nitrogen sparging for 30 minutes and purified by pumping through both 13X molecular sieve beads (available as Zeolite 3A, UOP) and a column of alumina (available as $Al_2O_3$, Aldrich, Brockmann I, 150 mesh, 58 Å). The THF stream was then fed directly to the STR. Catalysts 1.3 Molar (M) sec-butyl lithium in cyclohexane and 2.5 M n-butyl lithium in hexane were diluted by addition of pre-purified toluene.

STR

The STR had a capacity of 10 L and consisted of five approximately equal Pyrex cylinders, each with an outside diameter of 7.62 cm, an inside diameter of 6.99 cm, and a length of 57.2 cm. These were joined together with bored, grooved stainless steel disks. The STR was closed off at both ends with stainless steel disks, and the cylindrical sections were enclosed with jackets made of glass, available as Pyrex glass, (available from Coming Glass Works; Corning, N.Y.). The jackets were 0.32 cm thick, 52.1 cm long, and equipped with individual temperature sensing devices extending into the interior of the cylindrical sections. These temperature sensing devices permitted the temperature of the reaction mixture in each section to be monitored and adjusted up or down (as necessary) to a set point by varying the amount of steam and/or water flowing into the jacketed sections.

Extending through the center of the joined cylinders was a 1.27 cm diameter stainless steel shaft suspended along the cylinder axis by three shaft alignment pins extending from each of the end caps and attached to a circular bushing surrounding the shaft in the plane of each bored end cap. To the shaft was affixed, via set screws, 43 detachable stainless steel paddles with approximately 3.2 cm between each paddle. Two different types of paddles were used in the STR. The paddles consisted of (1) cylinders with a 1.27 cm hole cut through the center of the cylinder perpendicular to the cylinder axis and (2) rectangles with the long end perpendicular to the shaft axis and bent so that the center of the rectangle was wrapped half way around the shaft. The cylindrical paddles were 1.9 cm in diameter and 2.5 cm long thus providing a clearance from the inner wall of the glass cylinder of approximately 1.0 cm. The rectangular paddles were 1.9 mm thick and 4.1 cm wide and 4.8 cm long in reactor sections 1 and 2 (with a resulting clearance of 1.4 cm) or 5.1 cm wide and 5.7 cm long in reactor sections 3, 4, and 5 (with a resulting clearance of 0.6 cm). Rectangular paddles with a length of 5.7 cm and width varying between 1.3 cm and 2.5 cm were used near the bored end caps to avoid collision with the end flanges. The paddle configurations used was as follows: in section 1, six cylindrical paddles followed by four rectangular paddles; in section 2, eight rectangular paddles; in section 3, nine rectangular paddles; in section 4, eight rectangular paddles; and in section 5, eight rectangular paddles.

The shaft was attached to a 2.2 kW variable speed motor and driven at approximately 250 rpm. The direction of the shaft reversed about every minute.

Devolatilization

Unreacted monomer was stripped out of the reaction mixture by devolatization mechanism 50 when the polymer was intended for use in a solventless form instead of a solution form. Solution was passed through a Discotherm B High Viscosity Processor (available from List AG, Acton, Mass.) maintained at a reduced pressure of about 4–20 torr to permit recapture of volatile components without extensive degradation of the polymer.

Example 1

Poly(styrene-4-vinyl pyridine) Block Copolymer

This example illustrates the effect of the continuous process on properties of polymers made as different times.

An initiator slurry was prepared by mixing 1884.6 ml of 1.3 M sec-butyl lithium solution in 4823.8 g of $O_2$-free toluene and continuous stirring at room temperature for about 30 minutes. The stirring was done under $N_2$ to prevent stratification and oxygen contamination. Purified styrene monomer (pressure fed at a rate of 136.1 g/min) and purified toluene solvent (diaphragm pumped at a rate of 154.9 g/min) were fed into the STR. The initiator slurry was introduced by peristaltic pump at a rate of 19.6 ml/min into zone 1 of the STR. The monomer concentration of this reaction was 44 wt. % in styrene monomer. A color change, from clear to red-orange, was observed in zone 1 when the initiator solution contacted the monomer and an exotherm resulted. The mixture in zone 1 was kept constant at about 65° C. by adjusting the jacket temperature of zone 1 to 30° C. The temperature of the mixture in each of the 5 sections of the STR was individually maintained at: #1=65° C., #2=40° C., #3=40° C., #4=40° C., and #5=50° C. by adjusting the jacket temperature as needed.

The materials flowed through the first three zones in a plug-like fashion, facilitated by the stirring paddles along the reaction path. Polymerization continued to 100% completion by the end of zone 3, thereby forming a "living"

polystyrene reaction mixture polymer. At the start of zone 4, purified vinyl pyridine was added (at a rate of 7.0 g/min) to the "living" polystyrene reaction mixture, resulting in another color change, from red-orange to burgandy red. The color change indicated that a poly(styrene-4-vinyl pyridine) block copolymer had formed. In zone 5, a toluene solution of Irganox 1076 was added by peristaltic pump (1 wt. % solution at a rate of 10 g/min). The combined residence time for these reactions in the STR was 30 minutes. The resulting viscous solution was fed into a List Discotherm B devolitilizer. The polymer solution was devolatilized under a reduced pressure of 4–20 torr and a temperature of 130° C. and melt extruded from the List into silicone lined boxes. Samples A–C were taken at time intervals of 60, 120 and 180 minutes, respectively.

Each sample was tested for number average molecular weight ($M_n$), Polydispersity Index (PDI) and relative block concentration of styrene to vinyl pyridine. Results are shown in Table 1.

TABLE 1

| Example | Time (minutes) | Mol Wt ($M_n \times 10^4$) | PDI | Stryene/VP mole ratio |
| --- | --- | --- | --- | --- |
| 1-A | 60 | 2.16 | 2.59 | 95.7/4.3 |
| 1-B | 120 | 2.15 | 2.56 | 95.2/4.8 |
| 1-C | 180 | 2.20 | 2.89 | 95.3/4.7 |

As shown by Table 1, $M_n$, molecular weight distribution and polymer polydispersity of the polymer produced by the process of the invention remain substantially consistent over time.

Example 2

Poly(styrene-4-vinyl pyridine) Block Copolymer

This example illustrates the effect of another set of conditions of the continuous process on properties of polymers made as different times.

Example 2 was made as Example 1 except some process conditions were changed. An initiator slurry was prepared by mixing 753 ml of 1.3 M sec-butyl lithium solution in 4853 g of $O_2$-free cyclohexane and continuous stirring at room temperature for about 30 minutes. The stirring was done under $N_2$ to prevent stratification and oxygen contamination. Purified styrene monomer (pressure fed at a rate of 65.3 g/min) and purified cyclohexane solvent (diaphragm pumped at a rate of 134.3 g/min) were fed into the STR. The initiator slurry was introduced by peristaltic pump at a rate of 23.3 ml/min into zone 1 of the STR. The monomer concentration of this reaction was 31 wt. % in total monomers. The temperatures in zones 1 and 2 were the same as in Example 1. The temperatures in zone 3, zone 4 and zone 5 were maintained at 25° C., 20° C. and 20° C., respectively. Vinyl pyridine (989.23 g) was premixed with cyclohexane (3970 g) in a 2 gallon pressure can and pressure fed to the reactor after standard purification (as in example 1). At the start of zone 4, purified vinyl pyridine was added (pressure fed at a rate of 16.5 g/min) to the "living" polystyrene reaction mixture. This resulted in a lower ratio of styrene to vinyl pyridine in the finished block copolymer. The melt extruded polymer solution was a golden yellow color. Samples A–C were taken at time intervals of 120, 150 and 180 minutes, respectively.

Each sample was tested for number $M_n$, PDI, and relative block concentration of styrene to vinyl pyridine. Results are shown in Table 2.

TABLE 2

| Example | Time (minutes) | Mol Wt ($M_n \times 10^4$) | PDI | Stryene/VP mole ratio |
| --- | --- | --- | --- | --- |
| 2-A | 120 | 2.96 | 1.80 | 88.7/11.3 |
| 2-B | 150 | 2.96 | 2.05 | 88.7/11.3 |
| 2-C | 180 | 2.88 | 1.69 | 88.9/11.1 |

Table 2 provides a second example of the $M_n$, PDI and relative block concentration of the polymer produced by the process of the invention remaining substantiaily consistent over time.

Example 3

Poly(styrene-4-vinyl pyridine) (PS-VP) Block Copolymer

This example illustrates the effect of the temperature profile of the continuous process on properties of polymers.

Example 3 was made in a manner similar to Example 1 except some process conditions were changed. An initiator slurry was prepared by mixing 1200 ml of 1.3 M sec-butyl lithium solution in 2665 g of $O_2$-free toluene and continuous stirring at room temperature for about 30 minutes. The stirring was done under $N_2$ to prevent stratification and oxygen contamination. Purified styrene monomer (pressure fed at a rate of 130.0 g/min) and purified toluene solvent (diaphragm pumped at a rate of 165.8 g/min) were fed into the STR. The initiator slurry was introduced by peristaltic pump at a rate of 14.6 ml/min into zone 1 of the STR. At the start of zone 4, purified vinyl pyridine was added (pressure fed at a rate of 6.6 g/min) to the "living" polystyrene reaction mixture. The monomer concentration of this reaction was 42 wt. % in total monomers.

For Samples A to D, the temperatures in zones 1, 2, 3 and 5 were the same as in Example 1 and the temperature in zone 4 was maintained at 20° C., 30° C., 45° C. and 60° C., respectively. This resulted in a slightly lower ratio of styrene to vinyl pyridine in the finished block copolymer. Samples of quenched block copolymer were collected after zone 5 at 15 minute intervals. The process was allowed to run for 20 minutes before the first sample was taken to ensure temperature equilibrium because the valves that control the flow of coolant and steam into the coolant mix (to change or set a temperature) can often overshoot temperatures. To be accurate it was necessary for the solution to be at a set temperature for a set period of time after the change before samples were taken. After an hour, the zone 4 temperature was changed and sampling was repeated. For each sample, volatile components were removed by drying the polymer solution in toluene overnight in a vacuum oven set at a reduced pressure of 20 torr and a temperature of 100° C.

Each sample was tested for $M_n$, PDI and relative block concentration of styrene to vinyl pyridine. Results are shown in Table 3.

TABLE 3

| Example | Zone 4 Temp ° C. | Mol Wt ($M_n \times 10^4$) | PDI | Stryene/VP mole ratio |
| --- | --- | --- | --- | --- |
| 3-A | 20 | 2.06 | 2.05 | 95.5/4.5 |
| 3-B | 30 | 1.88 | 2.35 | 95.9/4.1 |

TABLE 3-continued

| Example | Zone 4 Temp ° C. | Mol Wt ($M_n \times 10^4$) | PDI | Stryene/VP mole ratio |
|---|---|---|---|---|
| 3-C | 45 | 1.48 | 2.56 | 95.8/4.2 |
| 3-D | 60 | 1.45 | 2.64 | 95.7/4.3 |

Table 3 shows that $M_n$ can decrease PDI can increase as the temperature of a downstream zone of the reactor (in this case zone 4 of a 5 zone STR) is increased. Deleterious side reactions that form lower molecular weight materials during vinyl pyridine polymerizations became more prevalent at higher temperatures as is evidenced by the increased PDI.

Example 4

Poly(isoprene-4-vinyl pyridine) Block Copolymer

This example illustrates that another class of block copolymer can be made from anionically polymerizable monomers with the continuous process.

An initiator slurry was prepared by mixing 350.3 ml of 1.3 M sec-butyl lithium with 5166.8 g of $O_2$-free cyclohexane and stirred at room temperature for about 30 minutes. Purified isoprene monomer (at a rate of 58.4 g/min), purified THF (pressure fed at a rate of 3.7 g/min) and purified cyclohexane solvent (diaphram pumped at a rate of 97.4 g/min) were fed into zone 1 of the STR. THF and isoprene were pressure fed, and cyclohexane was pumped. The initiator slurry was introduced by peristaltic pump at a rate of 15.6 ml/min into zone 1 of the STR. The monomer concentration of this reaction was 33 wt. % in total monomer. A color change of from clear to yellow was observed in zone 1, when the initiator solution contacted the monomer and an exotherm resulted. The reaction temperature was kept constant at about 53° C. by adjusting the jacket temperature of zone 1 to 20° C. The temperature of the reaction mixture in each of the 5 sections of the STR was individually maintained at: #1=53° C., #2=40° C., #3=40° C., #4=40° C., and #5=50° C.

The materials flowed through the first three zones in a plug-like fashion, facilitated by stirring paddles along the reaction path. Polymerization continued to 100% completion by the end of zone 3, thereby forming a "living" polyisoprene polymer mixture. At the start of zone 4, purified vinyl pyridine was added (at a rate of 3.2 g/min) to the "living" polyisoprene reactive mixture, resulting in another color change, from yellow to burgandy-brown, indicating that a poly(isoprene-4-vinyl pyridine) block copolymer had formed. In zone 5, a toluene solution of Irganox 1076 was added by peristaltic pump (1 wt. % solution at a rate of 10 g/min). The total residence time for these reactions was 37.5 minutes. The resulting viscous solution was fed into the List Discotherm B devolitilizer. The polymer solution was devolitilized under a reduced pressure of 4–20 torr and a temperature of 110° C., and melt extruded from the List as a golden yellow material into silicone-lined boxes. Samples A–B were taken at 80 minutes, and 120 minutes, respectively.

Each sample was tested for $M_n$, PDI, and relative concentration of 1,4 polyisoprene to 1,2 polyisoprene to 3,4 polyisoprene to vinyl pyridine. Results are shown in Table 4.

TABLE 4

| Example | Time minutes | Mol Wt ($M_n \times 10^4$) | PDI | 1,4-PI/1,2-PI/3,4-PI/VP mole ratio |
|---|---|---|---|---|
| 4-A | 80 | 1.86 | 2.43 | 23.2/12.8/60.9/3.1 |
| 4-B | 120 | 1.88 | 2.35 | 19.8/14.5/62.7/3.1 |

Table 4 provides another example of the $M_n$, PDI and relative monomer concentration of the polymer produced by the process of the invention remaining substantially consistent over time.

Example 5

Poly(styrene-isoprene) Block Copolymer

This example illustrates that another class of block copolymer can be made from anionically polymerizable monomers with the continuous process.

Example 5 was made in a manner similar to Example 4.

An initiator slurry was prepared by mixing 419.5 ml of 1.3 M sec-butyl lithium solution with 5113.1 g of $O_2$-free cyclohexane and stirred at room temperature for about 30 minutes. Purified styrene monomer (pressure fed at a rate of 69.9 g/min) and purified cyclohexane solvent (diaphgram pumped at a rate of 130.4 g/min) were fed into the STR. The initiator slurry was introduced by peristaltic pump at a rate of 23.33 ml/min into the STR. A color change of clear to orange-red was observed in Zone 1 when the initiator solution contacted the monomer and an exotherm resulted. The mixture in zone 1 was kept at a constant temperature of about 68° C., by adjusting the jacket temperature of Zone 1 to 20° C. The materials flowed through the first two zones in a plug-like fashion, facilitated by stirring paddles along the reaction path. This polymerization continued to substantially 100% completion by the end of zone 2, thereby forming "living" polystyrene materials. At the start of zone 3 purified isoprene (at a rate of 35.0 g/min) and purified THF (at a rate of 6.0 g/min) were added to the polymerized "living" polystyrene reaction. Another color change occurred from orange-red to yellow indicating that a poly (styrene-isoprene) block copolymer had formed. The addition of isoprene to the "living" polystyrene flow resulted in another exotherm. The mixture was kept constant at about 60° C., by adjusting the jacket temperature of zone 3 to 15° C. In zone 5, a toluene solution of Irganox 1076 was added by peristaltic pump (1 wt. % solution at a rate of 10 g/min). The total residence time for these reactions was 37.5 minutes. The monomer concentration of this reaction was 41 wt. % in total monomer. The resulting viscous solution was fed into the List Discotherm B devolatilizer. The polymer solution was devolatilized under reduced pressure of 4–20 torr and temperature of 125° C., and melt-extruded from the List as a beige material into silicone-lined boxes.

The example was tested for Mn, PDI, and relative block concentration of polyisoprene to styrene. Results are shown in Table 5.

TABLE 5

| Example | Mol Wt ($M_n \times 10^4$) | PDI | 1,4-PI/1,2-PI/3,4-PI/S mole ratio |
|---|---|---|---|
| 5 | 4.67 | 1.96 | 13.1/7.7/35.0/44.2 |

Table 5 provides data for a block copolymer that can be made with the continuous process of the invention.

Example 6

Poly(styrene-t-butyl methacrylate) Block Copolymer

This example illustrates that another class of block copolymer can be made from anionically polymerizable monomers with the continuous process.

An initiator slurry was prepared by mixing 1785 ml of 1.3 M sec-butyl lithium solution with 4918 g of dry, $O_2$-free toluene and stirred at room temperature for about 30 minutes. Purified styrene monomer (pressure fed at a rate of 96.7 g/min), and purified toluene solvent (pumped at a rate of 137.5 g/min) fed into the first zone of the STR. The initiator slurry was introduced by peristaltic pump (at a rate of 14.6 g/min) into the first zone of the STR. A color change from clear to orange-red was observed in zone 1 when the initiator solution contacted the monomer and an exotherm resulted. The materials in the first zone were kept at a constant temperature of about 65° C. by adjusting the jacket temperature of zone 1 to 34° C. The temperature of the reaction mixture in each of the 5 sections of the STR was individually maintained at: #1=65° C., #2=40° C., #3=20° C., #4=20° C., and #5=15° C.

The materials flowed through the first two zones in a plug-like fashion, facilitated by stirring paddles along the reaction path. This polymerization continued to substantially 100% completion by the end of zone 2, thereby forming "living" polystyrene materials. At the start of zone 3, purified diphenylethylene as a 5 wt. % solution in toluene was added by a positive displacement metering pump (at a rate of 20.0 g/min) to the "living" polystyrene reaction, resulting in a diphenylethylene-modified polystyryl chain. This chain was treated at the start of zone 4 with purified t-butyl methacrylate (pressure fed at a rate of 5 g/min) to form poly(styrene-t-butyl methacrylate) block copolymer. In zone 5, a toluene solution of Irganox 1076 was added by peristaltic pump (1 wt. % solution at a rate of 10 g/min). The residence time for these reactions was 37.5 minutes. The monomer concentration of this reaction was 40 wt. % in total monomer. The polymer solution was devolitilized under a reduced pressure of 4–20 torr and a temperature of 130° C., and melt extruded from the List as a vanilla-colored material into silicone-lined boxes. Samples A–F were taken at 60 minutes, 90 minutes, 120 minutes, 155 minutes, 195 minutes and 240 minutes, respectively.

Each sample was tested for $M_n$, PDI, and relative block concentration of styrene to t-butyl methacrylate. Results are shown in Table 6.

TABLE 6

| Example | Time minutes | Mol Wt ($M_n \times 10^4$) | PDI | Styrene/t-BMA mole ratio |
| --- | --- | --- | --- | --- |
| 6-A | 60 | 2.59 | 2.30 | 97.7/2/3 |
| 6-B | 90 | 2.29 | 2.29 | 95.9/4.1 |
| 6-C | 120 | 2.28 | 2.18 | 97.8/2.2 |
| 6-D | 155 | 2.37 | 2.13 | 98.7/1.3 |
| 6-B | 195 | 2.51 | 2.13 | 99.2/0.8 |
| 6-F | 240 | 2.45 | 2.21 | 99.1/0.9 |

Table 6 provides another example of the $M_n$, PDI, and relative block concentration of the polymer produced by the process of the invention remaining substantially consistent over time.

Example 7

Poly(styrene-t-butyl methacrylate) Block Copolymer

This example illustrates that a higher concentration of t-butyl methacrylate can be incorporated into a block copolymer that contains t-butyl methacrylate segments with the continuous process.

Example 7 was made in the same manner as Example 6 except some process conditions were changed. The temperatures of the reaction mixture in zones 1, 2, 3, and 5 were the same as in Example 6 and in zone 4 was maintained at 5° C. Also, the flow rate of the purified t-butyl methacrylate was increased to 30 g/min. The resulting block copolymer block copolymer was collected after zone 5 in 5 gallon pails and quenched by addition of isopropanol. The monomer concentration of this reaction was 39 wt. % in styrene monomer.

Volatile components were removed by vacuum drying these materials in an oven at 100° C. for 24 hours and the example was tested for $M_n$, PDI, and relative block concentration of styrene to t-butyl methacrylate. Results are shown in Table 7.

TABLE 7

| Example | Time minutes | Mol Wt ($M_n \times 10^4$) | PDI | Styrene/t-BMA mole ratio |
| --- | --- | --- | --- | --- |
| 7 | 30 | 2.59 | 2.43 | 80.3/19.7 |

Table 7 provides data for a high molecular weight t-butyl methacrylate content materials that can be made using the process of the invention.

Example 8

Poly(styrene-isodecylmethacrylate) Block Copolymer

This example illustrates that another class of block copolymer can be made from anionically polymerizable monomers with the continuous process.

Examples 8A and 8B were prepared in the manner similar to Example 6 except different monomers were used in place of t-butyl methacrylate and some conditions were changed.

The temperatures of the reaction mixture in zones 1, 2, 3 and 5 were the same as in Example 6 and in zone 4 was 5° C. For Example 8A and 8B, the diphenylethylene-modified polystyryl chain produced at the end of zone 3 was treated with purified isodecylmethacrylate at a flow rate of 45 g/min (monomer concentration of 39 wt. % in styrene) and purified glycidyl methacrylate at a flow rate of 5 g/min (monomer concentration of 39 wt. % in styrene), respectively. The resulting products for Example 8A and 8B were a poly(styrene-isodecylmethacrylate) block copolymer and a poly(styrene-glycidyl methacrylate) block copolymer, respectively. The copolymer was collected after zone 5 in 5 gallon pails and quenched by addition of isopropanol. The volatile components were then removed by vacuum drying in an oven at 120° C. for 24 hours.

The examples were tested for Mn, PDI, and relative block concentration of the different segments. Results are shown in Table 8.

TABLE 8

| | Mol Wt | | Segments | |
| --- | --- | --- | --- | --- |
| Example | ($M_n \times 10^4$) | PDI | type | mole ratio |
| 8A | 2.52 | 2.52 | Styrene/IDMA | 88.3/11.7 |
| 8B | 2.13 | 2.52 | Styrene/GMA | 98.4/1.6 |

Table 8 provides data for different classes of copolymer that can be made by the process of the invention.

Example 9

Starbranched/Hyperbranched Poly(styrene)

This example shows the versatility of the continuous method by extending the material classes that are accessible by this method to that of starbranched materials.

An initiator slurry was prepared by mixing 995 ml of 1.3 M sec-butyl lithium solution with 4665 g of dry, $O_2$-free toluene and stirred at room temperature for about 30 minutes. A 2 wt. % solution divinylbenzene in purified toluene solvent was prepared by mixing 281 g of the difunctional monomer in 1126 g of $O_2$-free toluene under a nitrogen atmosphere. Purified styrene monomer (pressure fed at a rate of 78.2 g/min), and purified toluene solvent (diaphragm pumped at a rate of 155.1 g/min) were fed into the first zone of the STR. The initiator slurry was introduced by peristaltic pump (at a rate of 75 g/min) into zone 1 of the STR. The monomer concentration of this reaction was 22 wt. % in styrene monomer. A color change, from clear to orange red, was observed in zone 1 when the initiator solution contacted the monomer and an exotherm resulted. The materials in the first zone were kept at a constant temperature of about 58° C. by adjusting the jacket temperature of zone 1 to 30° C. The temperature of the reaction mixture in each of the 5 sections of the STR was individually maintained at: #1=58° C., #2=58° C., #3=63° C., #4=56° C., and #5=50° C. The materials flow through the first four zones in a plug-like fashion, facilitated by stirring paddles along the reaction path. This polymerization continued to substantially 100% completion by the end of zone 4, thereby forming a "living" polystyrene polymer. A purified divinylbenzene, as a 2 wt. % solution in toluene, was added (at a rate of 6.25 g/min) at the start of Zone 5, resulting in a starbranched polystyryl chain as evidenced by the appearance of a burgandy colored solution, indicative of branching due to divinylbenzene. The total residence time for these reactions was 37.5, minutes. The material was collected after zone 5 in 5 gallon pails and quenched by addition of isopropanol. For each sample, volatile components were removed by vacuum drying these materials in an oven at 100° C. for 24 hours. A sample was taken at 60 minutes.

Volatile components were removed by vacuum drying this material in an oven at 100° C. for 24 hours and the sample was tested for Mn and PDI. Results are shown in Table 9.

TABLE 9

| Example | Time minutes | Mol Wt ($M_n \times 10^4$) | Mol Wt Distribution |
|---|---|---|---|
| 9 | 60 | 3.58 | 4.18 |

Table 9 provides data for a class of starbranched polymers that can be made with the process of the invention.

Example 10

N,N-(Dimethylamino)dimethylsilyl-terminated polyisoprene

Another class of materials which are accessible through use of this continuous process are end-functionalized materials.

An initiator slurry was prepared by mixing 530 ml of 1.3 M sec-butyl lithium solution with 2706 g of $O_2$-free cyclohexane and stirred at room temperature for about 30 minutes. A 3% solution of N,N-dimethylamino(dimethyl) chlorosilane in purified THF solvent was prepared by mixing 65 g of the chlorosilane in 1850 g of $O_2$-free THF under a nitrogen atmosphere. Purified isoprene monomer (pressure fed at a rate of 78.8 g/min), purified THF (pressure fed at a rate of 12 g/min) and purified cyclohexane solvent (diaphragm pumped at a rate of 103.1 g/min) were fed into zone 1 of the STR. The initiator slurry was introduced by peristaltic pump (at a rate of 19.4 ml/min) into zone 1 of the STR. A color change from clear to yellow was observed in zone 1, when the initiator solution contacted the monomer and an exotherm resulted. The reaction temperature was kept constant at about 63° C. by adjusting the jacket temperature of zone 1 to 0° C. The temperature of the reaction mixture in each of the 5 sections of the STR was individually maintained at: #1=63° C., #2=40° C., #3=40° C., #4=40° C., and #5=50° C.

The materials flowed through the first four zones in a plug-like fashion, facilitated by stirring paddles along the reaction path. This polymerization continued to substantially 100 % completion by the end of zone 4, thereby forming "living" poly(isoprene) polymer. At the start of zone 4, the THF solution of dimethylamino(dimethyl)chlorosilane was introduced by peristaltic pump (at a rate of 10.3 g/min), resulting in another color change, from yellow to a clear solution. The total residence time for these reactions was 37.5 minutes. Monomer concentration for this reaction was 40 wt. % in isoprene. Materials were collected under nitrogen in 5 gallon pails and quenched by addition of isopropanol. Volatile components were removed by vacuum drying the polymer in an oven at 100° C. for 24 hours.

The example was tested for Mn, PDI, and relative concentration of 1,4 polyisoprene to 1,2 polyisoprene to 3,4 polyisoprene. Results are shown in Table 10. The presence of the N,N-(Dimethylamino)dimethylsilyl ($SiMe_2NMe_2$) group was confirmed by $^1$H-NMR.

TABLE 10

| Example | Mol Wt ($M_n \times 10^4$) | PDI | 1,4-PI/1,2-PI/3,4-PI mole ratio |
|---|---|---|---|
| 10 | 11.3 | 2.17 | 23.2/12.8/60.9 |

Example 11

Poly(styrene-isoprene-4-vinylpyridine) Triblock Copolymers

To further emphasize the utility of this method, the STR was used to synthesize an ABC-type triblock copolymer by sequential monomer additions.

An initiator slurry was prepared by mixing 607 ml of 1.3 M sec-butyl lithium solution in cyclohexane with 6028 g of dry, $O_2$-free toluene and continuous stirring at room temperature for about 30 minutes. The stirring was done under $N_2$ to prevent stratification and oxygen contamination. Purified styrene monomer (pressure fed at a rate of 20.0 g/min), and purified toluene solvent (diaphragm pumped at a rate of 153.5 g/min) were fed into the 1$^{st}$ zone of the STR. The initiator slurry was introduced by peristaltic pump (at a rate of 15.7 g/min) into the STR. A color change from clear to orange-red was observed in zone 1 when the initiator solution contacted the monomer and an exotherm resulted. The materials in the first zone were kept at a constant temperature of about 65° C. by adjusting the jacket temperature of zone 1 to 36° C. The temperature of the reaction mixture in each of the 5 sections of the STR was individually maintained at: #1=65° C., #2=59° C., #3=50° C., #4=41° C., and #5=35° C.

The materials flowed through the first zone in a plug-like fashion, facilitated by stirring paddles along the reaction path. Polymerization continued to substantially 100% completion by the end of zone 1, thereby forming a "living" polystyrene polymer. At the start of zone 2, isoprene (at a rate of 76.5 g/min) and purified THF (at a rate of 6.5 g/min)

were added, resulting in a strong exotherm with a color change from red to yellow indicating the formation of polystyrene-isoprene block copolymers. The materials flowed through zones 2–4 in a plug-like fashion, facilitated by the tirring paddles along the reaction path and the polymerization continued to substantially 100% completion. At the start of Zone 5, vinyl pyridine is added (at a rate of 7.0 g/min) and the color of the resultant solution turned from yellow to dark burgundy. This triblock copolymer material was treated in zone 5 with a toluene solution of Irganox 1076 that was added by peristaltic pump (1 wt. % solution at a rate of 10 g/min). Monomer concentration for this reaction was 36% in total monomers. The polymer solution was devolitilized under a reduced pressure of 4–20 torr and a temperature of 110° C., and melt extruded from the List as a vanilla-colored material into silicone-lined boxes. The total residence time for the three reactions was 50 minutes.

The example was tested for relative block concentration of styrene to isoprene to vinyl pyridine. Results are shown in Table 11.

TABLE 11

| Example | S/1,4-PI/1,2-PI/3,4-PI/VP mole ratio |
| --- | --- |
| 11 | 20.9/22.4/6.3/38.6/11.7 |

Table 11 shows that triblock polymers can be made by the process of the invention.

Various modifications and alterations that do not depart from the scope and spirit of this invention will become apparent to those skilled in the art. This invention is not to be unduly limited to the illustrative embodiments set forth herein.

We claim:

1. A continuous process for making an anionically-polymerized organic material having a targeted architecture comprising
    a) introducing into a plug flow reactor having one or more temperature controlled sections a reaction mixture comprising at least one anionically-polymerizable monomer, an initiator system, and a solvent system such that the monomer concentration is 10 to 50 weight %;
    b) allowing the monomer to polymerize as the reaction mixture is laterally mixed as it travels in an essentially plug flow manner through the reactor; and
    c) discharging the polymerized organic material.

2. The process of claim 1 wherein at least one anionically-polymerizable monomer is temperature-sensitive.

3. The process of claim 1 wherein at least two anionically-polymerizable monomers are simultaneously introduced into the reactor such that a random copolymer is formed.

4. The process of claim 3 wherein at least one of the anionically-polymerizable monomers is temperature-sensitive.

5. The process of claim 3 further comprising adding at least one temperature-sensitive anionically-polymerizable monomer to the reaction mixture comprising the random copolymer.

6. The process of claim 2 wherein the temperature-sensitive monomer is vinyl pyridine or alkyl methacrylate.

7. The process of claim 6 wherein the vinyl pyridine monomer is 2-vinyl pyridine or 4-vinyl-pyridine.

8. The process of claim 6 wherein the temperature-sensitive monomer is vinyl pyridine and the initiator is selected from the group comprising n-butyl lithium, sec-butyl lithium, tert-butyl lithium, fluorenyl lithium, naphthyllithium, phenyllithium, and p-tolyllithium.

9. The process of claim 6 wherein the alkyl methacrylate monomer is selected from the group comprising tert-butyl methacrylate, methyl methacrylate, isodecyl methacrylate, $n\text{-}C_{12}H_{25}$, $n\text{-}C_{18}H_{37}$, allyl methacrylate, 2-ethylhexyl methacrylate and glycidyl methacrylate.

10. The process of claim 6 wherein the monomer is alkyl methacrylate and the initiator is selected from the group comprising α-methylstyrene-lithium, and 1,1-diphenylhexyllithium.

11. The process of claim 6 further comprising: quenching the organic material with a quenching agent after step c).

12. The process of claim 11 wherein the quenching agent is selected from the group consisting of chloroorganosilylalkenes, 1-(3-bromopropyl)-2,2,5,5-tetramethyl-1-aza-2,4-disilacyclopentane, (3-bromopropoxy)-tert-butyldimethylsilane, 2-(3-bromopropoxy)tetrahydro-2H-pyran, glycidyl methacrylate, and ethylene oxide.

13. The process of claim 11 wherein the quenching agent contains a protected organofunctional group and the organic material is end-functionalized.

14. The process of claim 1 further comprising adding one or more steps between b) and c) above wherein one or more polymerizable monomers are sequentially added to the reaction mixture such that a block copolymer is formed as the reaction mixture continues to travel in an essentially plug flow manner through the plug flow reactor.

15. The process of claim 14 wherein at least one of the polymerizable monomers is temperature-sensitive.

16. The process of claim 1 wherein at least one anionically-polymerizable monomer has at least two anionically-polymerizable sites.

17. The process of claim 1 wherein at least one anionically-polymerizable monomer has at least one functional site in addition to an anionically-polymerizable site.

18. The process of claim 1 further comprising removing the solvent from the reaction mixture containing the polymerized organic material after c).

19. The process of claim 1 wherein the reactor has two or more temperature-controlled sections and each is maintained between −20° C. and 70° C.

20. The process of claim 1 wherein the solvent system comprises one or more components selected from the group comprising benzene, cyclohexane, toluene, ethylbenzene, and tetrahydrofuran.

21. The process of claim 1 wherein the reactor is a stirred tubular reactor.

22. The process of claim 1 wherein the reactor is a combination of a stirred tubular reactor and an extruder.

23. The process of claim 1 wherein the anionically-polymerizable monomer is selected from the group comprising vinyl aromatics, polymerizable dienes, anionically-polymerizable polar monomers, and anionically-polymerizable cyclic monomers.

24. The process of claim 1 wherein the monomers of the system are selected from the group consisting of styrene, p-methylstyrene, isoprene, isoprene-derivatives, isodecylmethacrylate, t-butyl acrylate, t-butyl methacrylate, vinyl pyridine, vinyl pyridine derivatives, ethylene oxide, hexamethyltrisiloxane, and butadiene.

\* \* \* \* \*

UNITED STATES PATENT AND TRADEMARK OFFICE
CERTIFICATE OF CORRECTION

PATENT NO.    : 6,448,353 B1
DATED         : September 10, 2002
INVENTOR(S)   : James M. Nelson It is certified that error appears in the above-identified patent and that said Letters Patent is hereby corrected as shown below:

<u>Column 6,</u>
Line 42, delete the word "trooctylaluminum" and insert in place thereof -- trioctylaluminum --.

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,448,353 B1
DATED        : September 10, 2002
INVENTOR(S)  : Nelson, James M.

It is certified that error appears in the above-identified patent and that said Letters Patent is hereby corrected as shown below:

<u>Column 10,</u>
Line 56, delete "wich" and insert in place thereof -- which --.

<u>Column 15,</u>
Line 13, delete "Bsters" and insert in place thereof -- Esters --.

Signed and Sealed this

Twentieth Day of May, 2003

JAMES E. ROGAN
*Director of the United States Patent and Trademark Office*